United States Patent
Sone et al.

(10) Patent No.: US 12,487,548 B2
(45) Date of Patent: Dec. 2, 2025

(54) IMAGE FORMING APPARATUS CAPABLE OF FEEDING RECORDING PAPER SHEET FROM ALTERNATIVE SHEET FEED DEVICE WHEN UNABLE TO FEED RECORDING PAPER SHEET FROM SHEET FEED DEVICE FOR ADJUSTMENT PROCESSING

(71) Applicant: KYOCERA Document Solutions Inc., Osaka (JP)

(72) Inventors: Daiki Sone, Osaka (JP); Shinji Nakatsuka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/926,878

(22) Filed: Oct. 25, 2024

(65) Prior Publication Data

US 2025/0138465 A1   May 1, 2025

(51) Int. Cl.
*G03G 15/00* (2006.01)
*B41J 11/48* (2006.01)
*G06F 3/12* (2006.01)

(52) U.S. Cl.
CPC ........ *G03G 15/6508* (2013.01); *B41J 11/485* (2013.01); *G03G 15/5016* (2013.01); *G06F 3/121* (2013.01); *G06F 3/1235* (2013.01)

(58) Field of Classification Search
CPC ............. G03G 15/6508; G03G 15/5016; B41J 11/485; G06F 3/121; G06F 3/1235
See application file for complete search history.

(56) References Cited

U.S. PATENT DOCUMENTS

| 2005/0275706 A1* | 12/2005 | Takagi | B41J 2/16508 347/104 |
| 2010/0091053 A1* | 4/2010 | Jackson | B41J 2/2139 347/19 |
| 2013/0216244 A1 | 8/2013 | Miyazaki | |

(Continued)

FOREIGN PATENT DOCUMENTS

| JP | H11212424 A | 8/1999 |
| JP | 2020037210 A | 3/2020 |

*Primary Examiner* — David H Banh
(74) *Attorney, Agent, or Firm* — IP Business Solutions, LLC.

(57) ABSTRACT

An image forming apparatus includes a plurality of sheet feed devices, an image forming device, and a control device functioning as a controller. The image forming device performs image formation based on a print job or adjustment processing. In executing the adjustment processing, the controller selects, from among the plurality of sheet feed devices, the sheet feed device for adjustment processing about which attribute information meeting a necessary condition for executing the adjustment processing is previously set, allows the selected sheet feed device for adjustment processing to feed the recording paper sheet, and allows the image forming device to perform the adjustment processing. When, in executing the adjustment processing, the sheet feed device for adjustment processing is unable to feed the recording paper sheet, the controller allows a sheet feed device predetermined as an alternative sheet feed device for adjustment processing to feed the recording paper sheet.

8 Claims, 13 Drawing Sheets

(56) References Cited

U.S. PATENT DOCUMENTS

| | | | |
|---|---|---|---|
| 2015/0277335 A1* | 10/2015 | Bradford | B65H 7/20 |
| | | | 399/21 |
| 2016/0121635 A1* | 5/2016 | Takata | B41J 2/175 |
| | | | 347/19 |
| 2020/0070541 A1 | 3/2020 | Kawatoko et al. | |

* cited by examiner

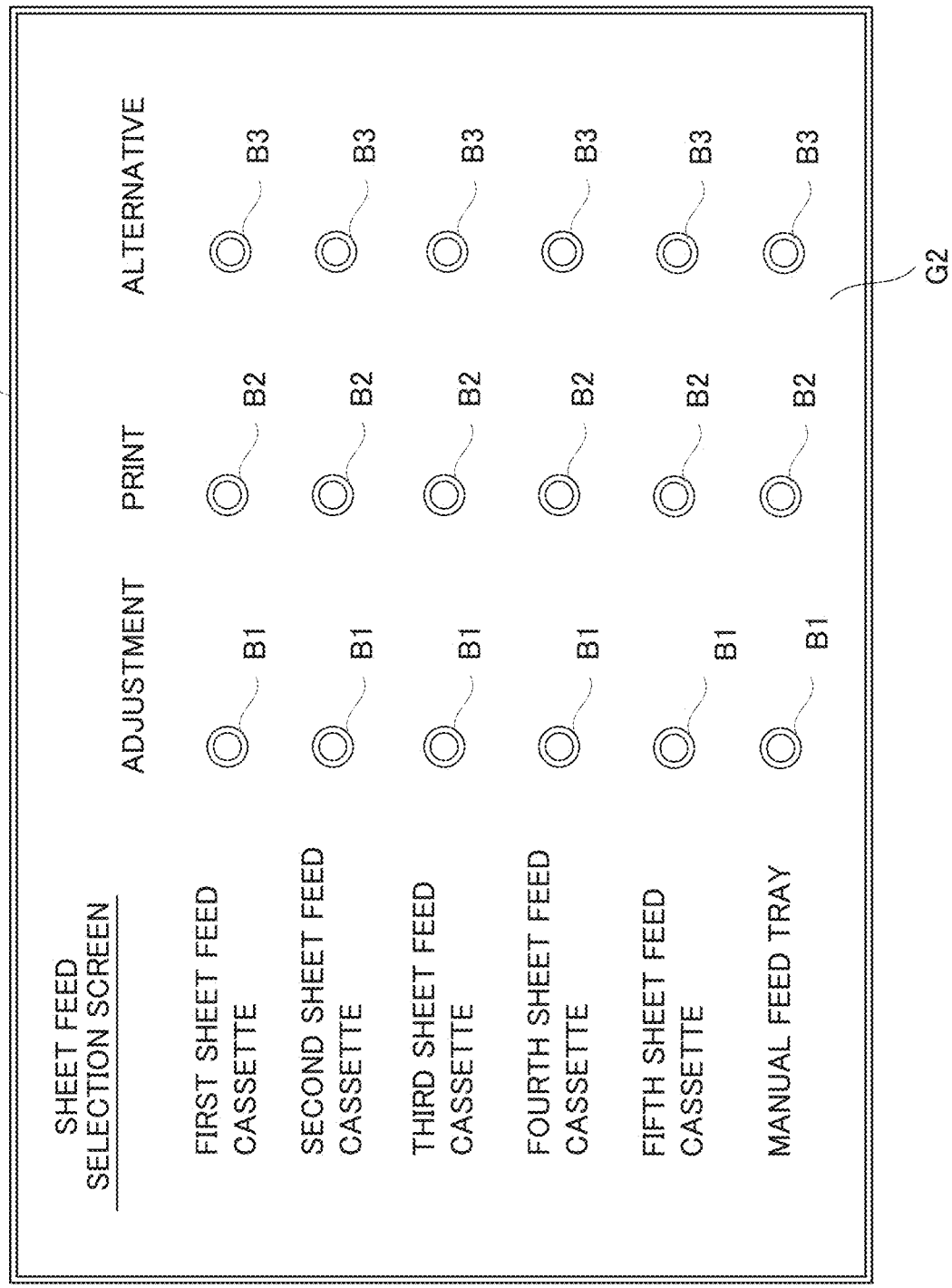

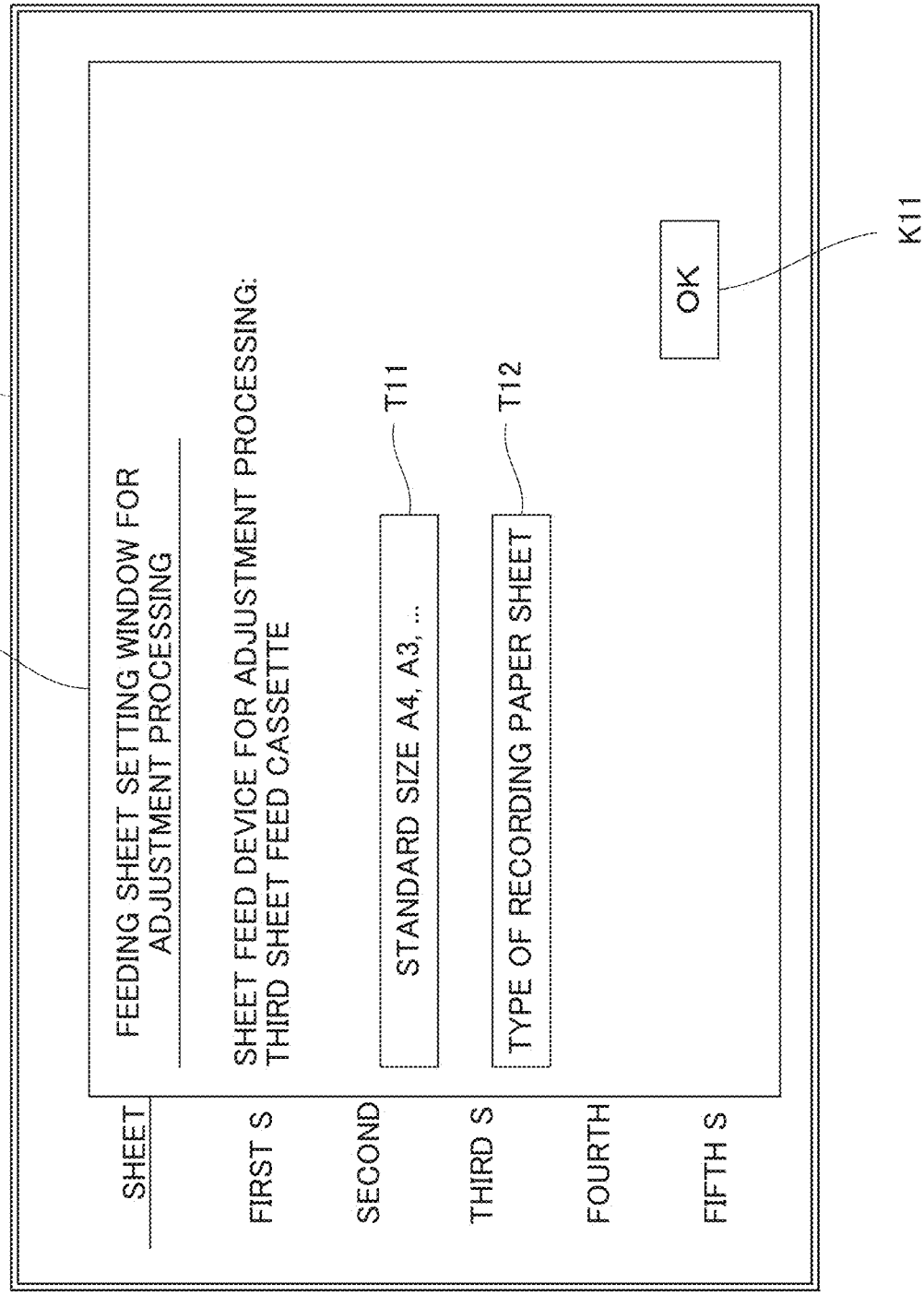

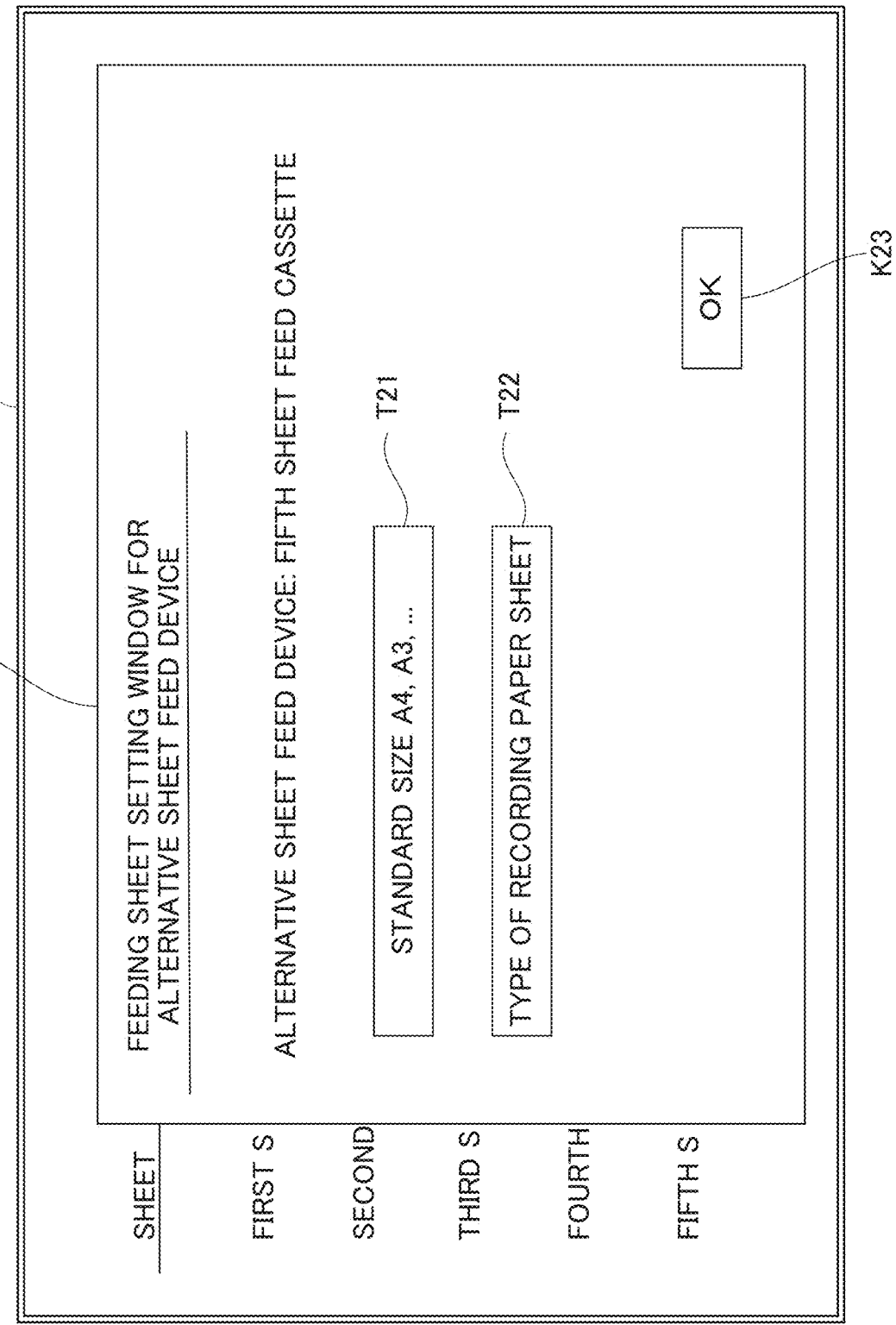

Fig.8

| | USAGE OF FEEDING | TYPE OF ADJUSTMENT PROCESSING | SIZE OF RECORDING PAPER SHEET | TYPE OF RECORDING PAPER SHEET |
|---|---|---|---|---|
| FIRST SHEET FEED CASSETTE | PRINT JOB | | STANDARD SIZE A4 | PLAIN PAPER |
| SECOND SHEET FEED CASSETTE | PRINT JOB | | STANDARD SIZE A3 | PLAIN PAPER |
| THIRD SHEET FEED CASSETTE | ADJUSTMENT PROCESSING | TYPE I | STANDARD SIZE A4 | PLAIN PAPER |
| FOURTH SHEET FEED CASSETTE | ADJUSTMENT PROCESSING | TYPE II | STANDARD SIZE A3 | PLAIN PAPER |
| FIFTH SHEET FEED CASSETTE | ALTERNATIVE | | STANDARD SIZE A3 | RECYCLED PAPER |
| MANUAL FEED TRAY | PRINT JOB | | STANDARD SIZE A4 | PLAIN PAPER |

DT

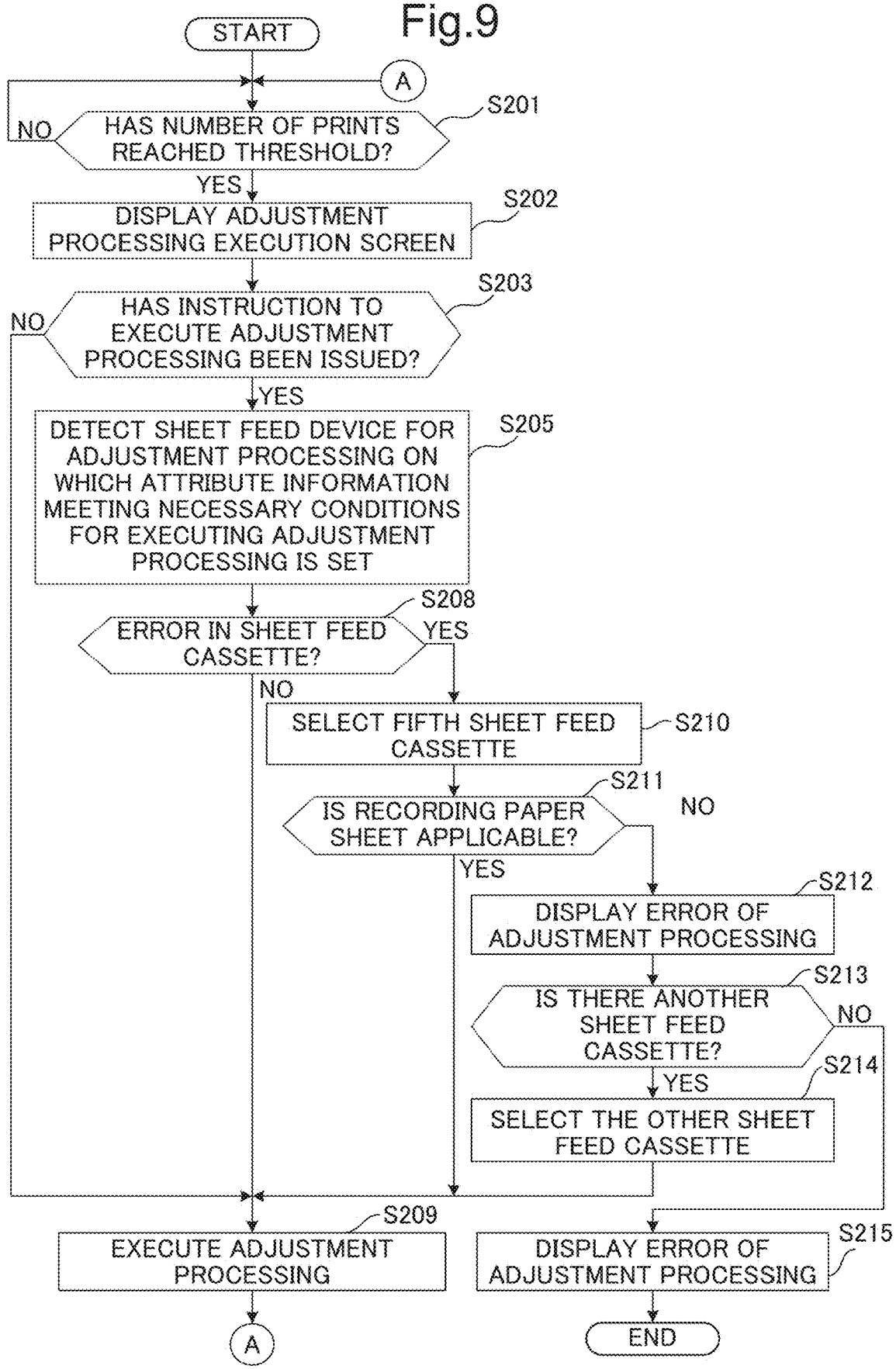

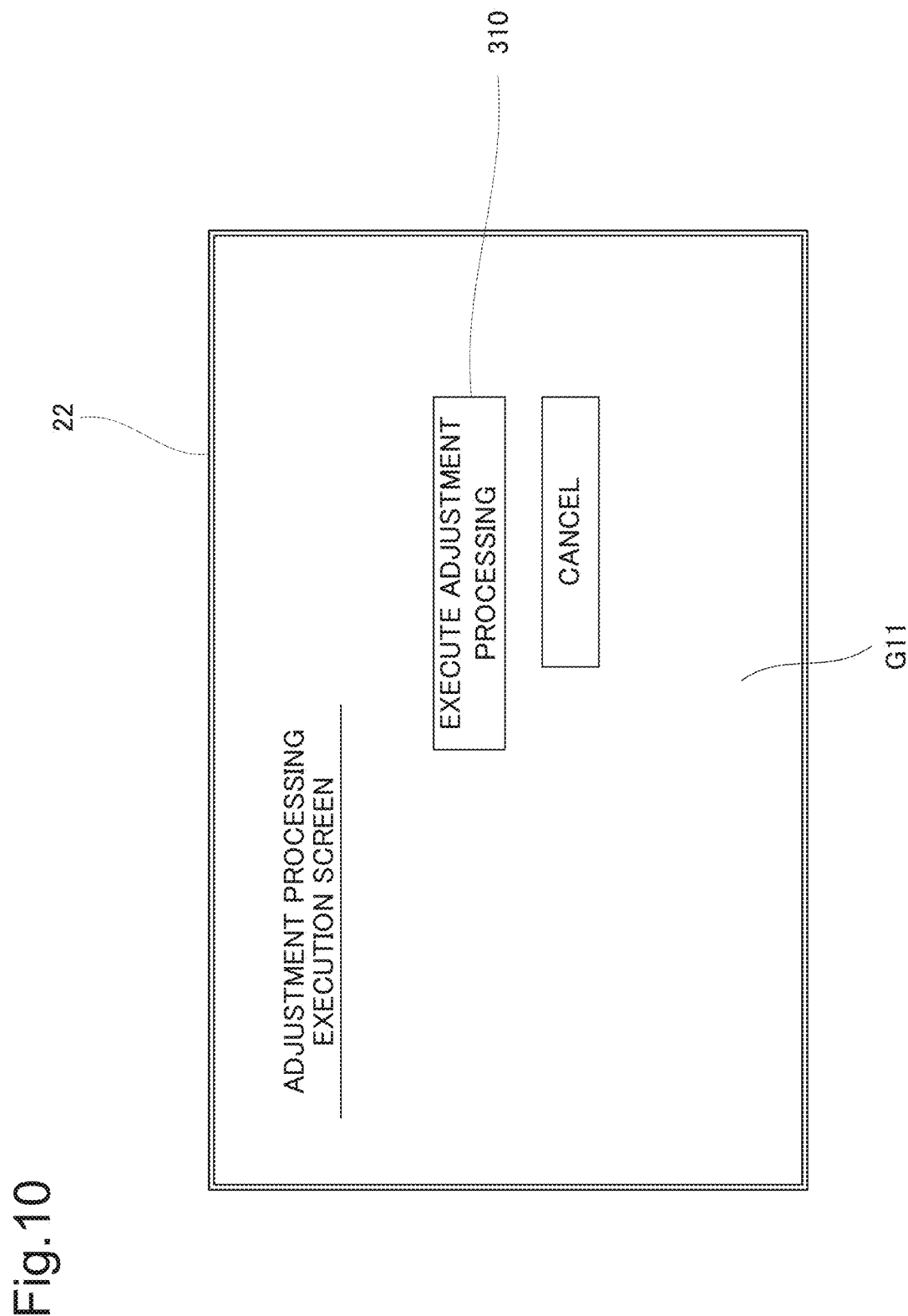

Fig. 11

ERROR DISPLAY SCREEN ABOUT SHEET FEED CASSETTE

ALTERNATIVE SHEET FEED DEVICE: FIFTH SHEET FEED CASSETTE

ERROR HAS OCCURRED IN ALTERNATIVE SHEET FEED DEVICE.
SHEET FEED CASSETTE OR LIKE FOR FEEDING RECORDING PAPER SHEET WILL BE CHANGED.

IMAGE FORMING APPARATUS CAPABLE OF FEEDING RECORDING PAPER SHEET FROM ALTERNATIVE SHEET FEED DEVICE WHEN UNABLE TO FEED RECORDING PAPER SHEET FROM SHEET FEED DEVICE FOR ADJUSTMENT PROCESSING

INCORPORATION BY REFERENCE

This application claims priority to Japanese Patent Application No. 2023-185868 filed on 30 Oct. 2023, the entire contents of which are incorporated by reference herein.

BACKGROUND

The present disclosure relates to image forming apparatuses that perform, on a recording paper sheet fed from a sheet feed device, image formation based on a print job or adjustment processing which is image formation for a predetermined adjustment. Particularly, the present disclosure relates to a technique for selecting a sheet feed device that feeds a recording paper sheet for use in the adjustment processing.

There is generally known an image forming apparatus employing an electrophotographic system or an image forming apparatus employing an ink-jet system. In the electrophotographic system, toner is fixed on a recording paper sheet to form an image on the recording paper sheet. In the ink-jet system, ink is ejected onto a recording paper sheet to form an image on the recording paper sheet. In the image forming apparatus based on the electrophotographic system, for the purpose of adjusting the density of an image, adjustment processing for forming a pattern on a recording paper sheet is performed. In the image forming apparatus based on the ink-jet system, adjustment processing for purging residual ink in an ink head onto a recording paper sheet is performed.

A general recording apparatus includes a plurality of cassettes in which different types of recording media are accommodated, determines a recording medium (for example, a widest recording medium) on which a check pattern is to be recorded in order of priority of the size of recording medium and in order of priority of the type of recording medium, selects, from among the plurality of cassettes, a cassette in which the determined type of recording medium is accommodated, feeds a recording medium from the selected cassette, and records the check pattern on the recording medium.

SUMMARY

A technique improved over the aforementioned techniques is proposed as one aspect of the present disclosure.

An image forming apparatus according to an aspect of the present disclosure includes a plurality of sheet feed devices, an image forming device, and a control device. The plurality of sheet feed devices feed a recording paper sheet. The image forming device performs, on the recording paper sheet fed from one of the sheet feed devices, image formation based on a print job or adjustment processing that is image formation for a predetermined adjustment. The control device includes a processor and functions as a controller through the processor executing a control program. In executing the adjustment processing, the controller selects, from among the plurality of sheet feed devices, the sheet feed device for adjustment processing about which attribute information meeting a necessary condition for executing the adjustment processing is previously set, allows the selected sheet feed device for adjustment processing to feed the recording paper sheet, and allows the image forming device to perform the adjustment processing. When, in executing the adjustment processing, the sheet feed device for adjustment processing is unable to feed the recording paper sheet, the controller allows a sheet feed device predetermined as an alternative sheet feed device for adjustment processing to feed the recording paper sheet.

BRIEF DESCRIPTION OF THE DRAWINGS

FIG. 5 is a view showing an example of a sheet feed selection screen.

FIG. 6 is a view showing an example of a feeding sheet setting window for adjustment processing.

FIG. 7 is a view showing an example of a feeding sheet setting window for print job (or alternative sheet feed).

FIG. 8 is a view conceptually showing a data table in which respective sets of attribute information about sheet feed cassettes are written.

FIG. 9 is a flowchart showing a processing flow during execution of the adjustment processing.

FIG. 10 is a view showing an example of an adjustment processing execution screen.

FIG. 11 is a view showing an example of an error display screen.

DETAILED DESCRIPTION

Hereinafter, a description will be given of embodiments of the present disclosure with reference to the drawings.

First Embodiment

Figure 1:
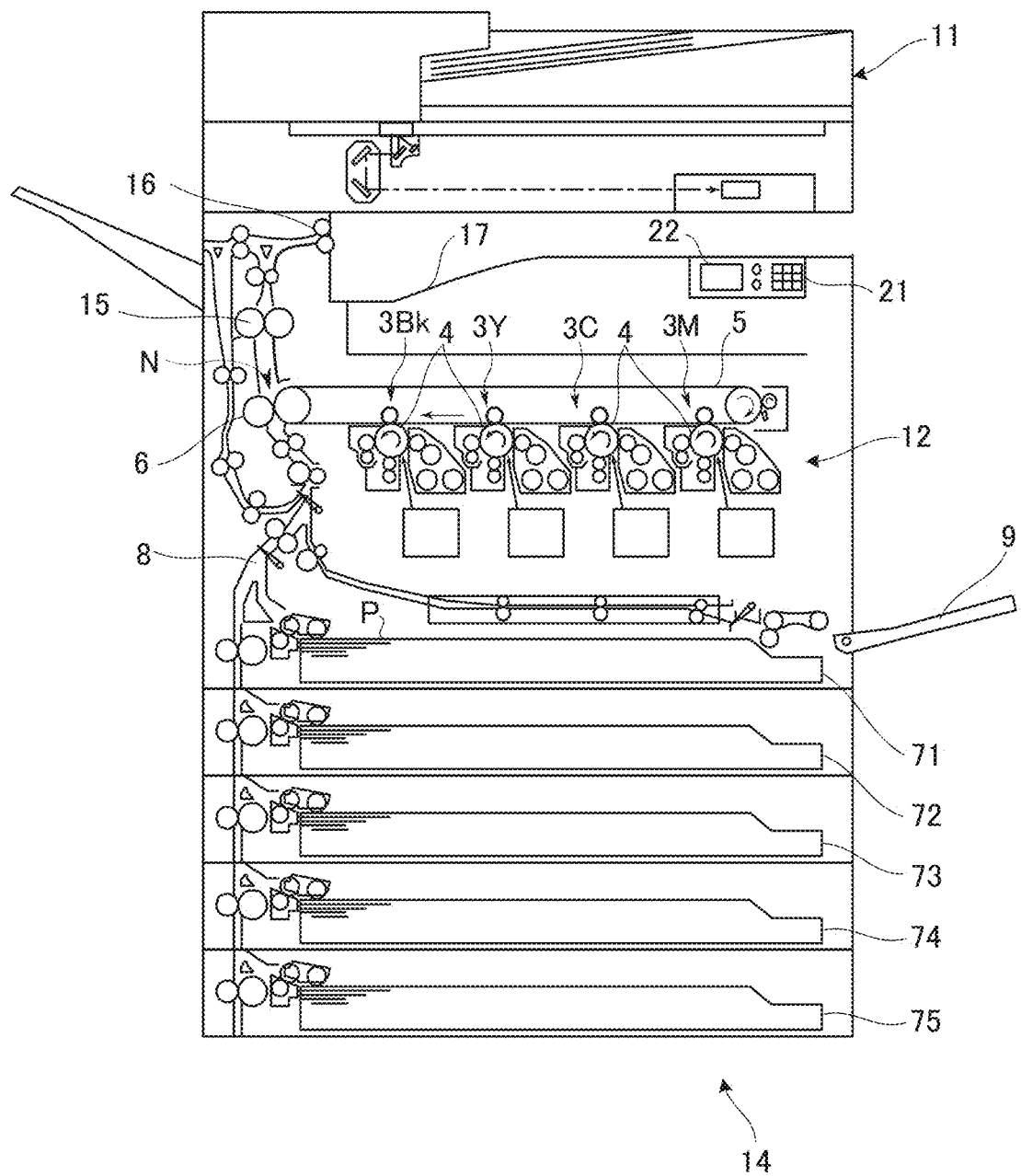
FIG. 1 is a cross-sectional view showing an image forming apparatus according to a first embodiment of the present disclosure.

FIG. 1 is a cross-sectional view showing an image forming apparatus 10 according to a first embodiment of the present disclosure. As shown in FIG. 1, the image forming apparatus 10 is an MFP (a multifunction peripheral) combining a plurality of functions, including a copy function and a scan function. The image forming apparatus 10 includes an image reading device 11 and an image forming device 12.

The image reading device 11 includes an image pickup device (such as a CCD (charge coupled device) sensor or a contact image sensor) that optically reads an image of an original document, and generates image data representing the image of the original document from an analog output of the image pickup device.

The image forming device 12 forms, on a recording paper sheet P, an image represented by the image data in an electrophotographic system. The image forming device 12 includes an image forming unit 3M for magenta, an image forming unit 3C for cyan, an image forming unit 3Y for yellow, and an image forming unit 3Bk for black. In each of these image forming units 3M, 3C, 3Y, and 3Bk, the surface of a photosensitive drum 4 is uniformly charged and then exposed to light to form an electrostatic latent image thereon, the electrostatic latent image on the surface of the photosensitive drum 4 is then developed into a toner image, and the toner image on the photosensitive drum 4 is primarily transferred to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feeder 14 via a conveyance path 8.

The sheet feeder 14 includes a first sheet feed cassette 71, a second sheet feed cassette 72, a third sheet feed cassette 73, a fourth sheet feed cassette 74, a fifth sheet feed cassette 75, and a manual feed tray 9. A recording paper sheet P is fed and conveyed from one of the sheet feed cassettes 71 to 75 to the conveyance path 8 or fed and conveyed from the manual feed tray 9 to the conveyance path 8. When the recording paper sheet P is sent out to the conveyance path 8, the multicolor toner image on the intermediate transfer belt 5 is secondarily transferred, at the nip region N, on the recording paper sheet P. The first sheet feed cassette 71, the second sheet feed cassette 72, the third sheet feed cassette 73, the fourth sheet feed cassette 74, the fifth sheet feed cassette 75, and the manual feed tray 9 are examples of the sheet feed devices defined in CLAIMS.

A fixing device 15 applies heat and pressure to the recording paper sheet P to fix the toner image on the recording paper sheet P by heat and pressure. The recording paper sheet P is ejected through an ejection roller 16 to a sheet output tray 17.

Figure 2:
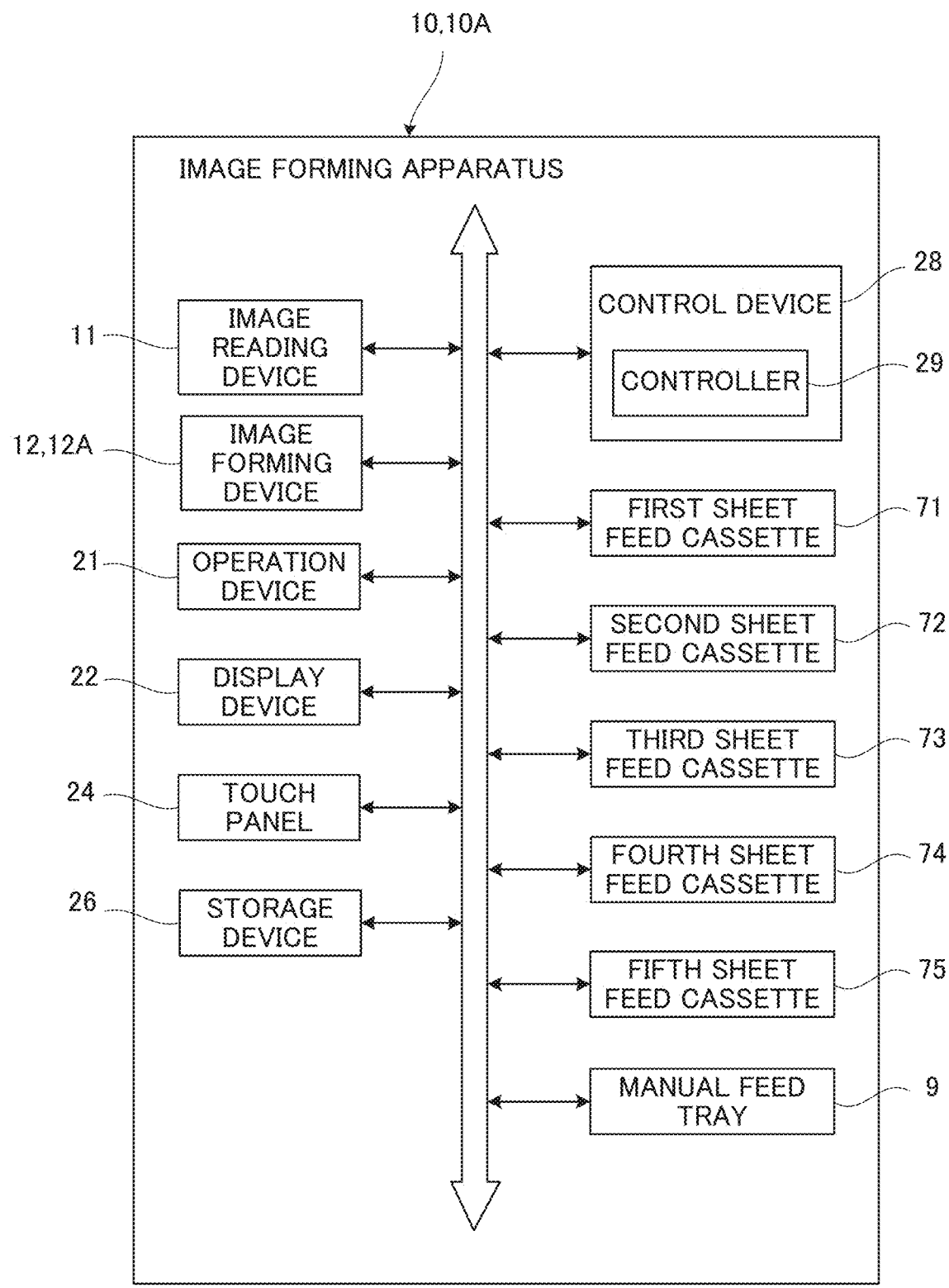
FIG. 2 is a block diagram showing an essential internal configuration of the image forming apparatus.

FIG. 2 is a block diagram showing an internal configuration of the image forming apparatus 10. As shown in FIG. 2, the image forming apparatus 10 includes the image reading device 11, the image forming device 12, an operation device 21, a display device 22, a touch panel 24, a storage device 26, the sheet feed cassettes 71 to 75, the manual feed tray 9, and a control device 28. These components are capable of sending and receiving data or signal from and to each other via a bus.

The operation device 21 includes physical keys, including numeric keys, an Enter key, and a Start key. The display device 22 is composed of a liquid crystal display (LCD), an organic EL (organic light-emitting diode (OLED)) display or the like.

The touch panel 24 is disposed on the screen of the display device 22. The touch panel 24 is a touch panel of, for example, a resistive film system or a capacitance system. The touch panel 24 detects a touch of the touch panel 24 with a user's finger or the like, together with the point of touch, and outputs a detection signal indicating the coordinate of the point of touch to a controller 29 described later of the control device 28. The touch panel 24 is a portion of the operation device 21.

The storage device 26 is a large storage device, such as an SSD (solid state drive) or an HDD (hard disk drive). The storage device 26 stores various application programs and various types of data.

The control device 28 is composed of a processor, a RAM (random access memory), a ROM (read only memory), and so on. The processor is, for example, a CPU (central processing unit), an ASIC or an MPU (micro processing unit). When a control program stored in the above-mentioned ROM or storage device 26 is executed by the above-mentioned processor, the control device 28 functions as a controller 29.

The controller 29 provides overall control of the image forming apparatus 10. The controller 29 is connected to the image reading device 11, the image forming device 12, the operation device 21, the display device 22, the touch panel 24, the storage device 26, the sheet feed cassettes 71 to 75, the manual feed tray 9, and so on and performs control of the operations of these components, and sending and receiving of signal or data to and from these components.

The controller 29 serves as a processing device that executes various types of processing and so on necessary for image formation of the image forming apparatus 10. The controller 29 accepts an instruction on operation input by the user, based on a detection signal output from the touch panel 24 or an operation on a physical key of the operation device 21. For example, the controller 29 accepts through the touch panel 24 a touch gesture on a GUI (graphical user interface) or the like displayed on the screen of the display device 22. The controller 29 has the function of controlling the display operation of the display device 22.

The controller 29 controls respective drive sources (such as motors) that actuate the respective sheet feed cassettes 71 to 75 to allow one of the sheet feed cassettes 71 to 75 to feed a recording paper sheet P to the conveyance path 8.

When, in the image forming apparatus 10 having the above structure, the controller 29 performs an image forming operation by allowing the image reading device 11 to read an image of an original document, allowing the sheet feeder 14 to feed a recording paper sheet P from one of the sheet feed cassettes 71 to 75 or the manual feed tray 9, inputting image data representing the image of the original document to the image forming device 12 based on a print job, and allowing the image forming device 12 to form the image of the original document on the fed recording paper sheet P.

The controller 29 counts the number of recording paper sheets P on which an image has been formed by the image forming device 12. When the number of recording paper sheets P counted reaches a predetermined threshold value, the controller 29 performs adjustment processing by allowing the sheet feeder 14 to feed a recording paper sheet P from one of the sheet feed cassettes 71 to 75 or the manual feed tray 9, inputting image data representing respective predetermined patterns in black, yellow, cyan, and magenta to the image forming device 12, and allowing the image forming device 12 to form the patterns in the four colors on the recording paper sheet P.

For example, seeing the patterns in the four colors formed on the recording paper sheet P, the user operates the operation device 21 to input respective amounts of density adjustment for the four color components of an image to be formed on a recording paper sheet P by the image forming device 12. Based on the respective amounts of density adjustment for the four color components input to the operation device 12, the controller 29 controls the image forming device 12 to correct the respective densities of the four color components of an image to be formed on a recording paper sheet P by the image forming device 12. Alternatively, the user allows the image reading device 11 to read the respective patterns in the four colors formed on the recording paper sheet P. The controller 29 determines the respective densities of the patterns in the four colors read by the image reading device 11 and, based on the respective determined densities of the four color components, controls the image forming device 12 to correct the respective densities of the four color components of an image to be formed on a recording paper sheet P by the image forming device 12.

As described previously, the image forming apparatus 10 is provided with the first sheet feed cassette 71, the second sheet feed cassette 72, the third sheet feed cassette 73, the fourth sheet feed cassette 74, the fifth sheet feed cassette 75, and the manual feed tray 9. Therefore, the controller 29 allows the sheet feeder 14 to feed a recording paper sheet P for use in image formation based on a print job or a recording paper sheet P for use in image formation during adjustment processing from one of the sheet feed cassettes or the manual feed tray. The adjustment processing includes Type I and Type II. Type I refers to adjustment processing in which the size and layout of the patterns in black, yellow, cyan, and magenta to be formed on a recording paper sheet P are adapted to a standard size "A4" sheet. Type II refers to adjustment processing in which the size and layout of the patterns in the four colors to be formed on a recording paper sheet P are adapted to a standard size "A3" sheet.

The respective patterns in four colors adapted to a standard size "A4" sheet for adjustment processing Type I, and the respective patterns in four colors adapted to a standard size "A3" sheet for adjustment processing Type II are previously stored in the storage device 26, read from the storage device 26 by the controller 29, and used for adjustment processing by the controller 29.

In the image forming apparatus 10, the controller 29 sets each of the first sheet feed cassette 71, the second sheet feed cassette 72, the third sheet feed cassette 73, the fourth sheet feed cassette 74, the fifth sheet feed cassette 75, and the manual feed tray 9 to one of a sheet feed device for print job that feeds a recording paper sheet P for image formation during execution of a print job, a sheet feed device for adjustment processing that feeds a recording paper sheet P for image formation during execution of adjustment processing, and an alternative sheet feed device as an alternative sheet feed device for adjustment processing that feeds a recording paper sheet P when, in executing the adjustment processing, the sheet feed device for adjustment processing is unable to feed a recording paper sheet P. The controller 29 allows, for example, a non-volatile memory or the like contained in the control device 28 to store the above settings on the sheet feed cassettes and the manual feed tray.

Next, a description will be given of sheet feed device setting processing for setting each of the sheet feed cassettes 71 to 75 and the manual feed tray 9 to a sheet feed device for print job, a sheet feed device for adjustment processing or an alternative sheet feed device, with reference to the flowchart shown in FIG. 3 and so on.

The user puts into each of the sheet feed cassettes 71 to 75, for example, recording paper sheets of standard size. Here, assume that plain-paper recording paper sheets of standard size "A4" are accommodated in the first sheet feed cassette 71, plain-paper recording paper sheets of standard size "A3" are accommodated in the second sheet feed cassette 72, plain-paper recording paper sheets of standard size "A4" are accommodated in the third sheet feed cassette 73, plain-paper recording paper sheets of standard size "A3" are accommodated in the fourth sheet feed cassette 74, and recycled-paper recording paper sheets of standard size "A3" are accommodated in the fifth sheet feed cassette 75.

Figure 4:
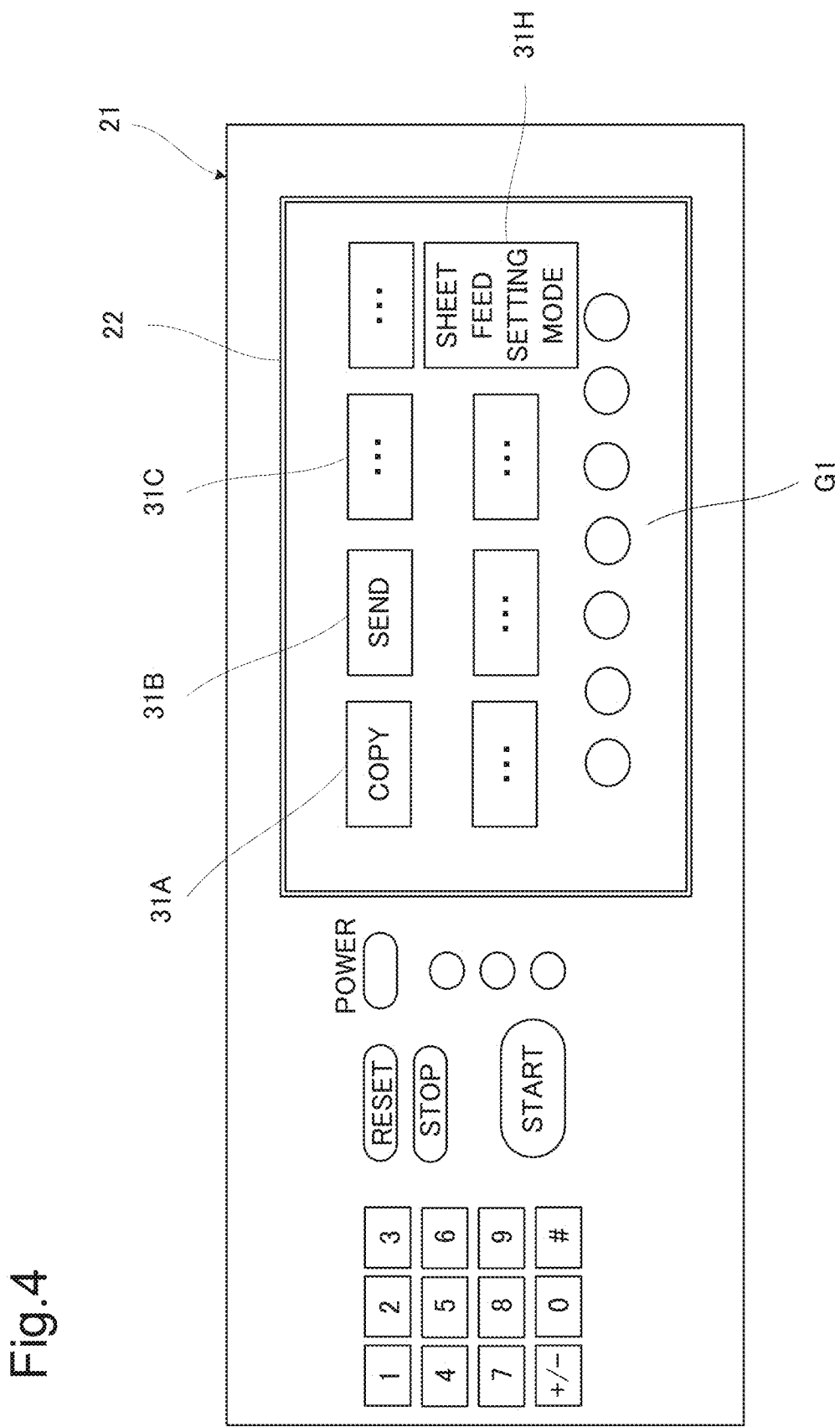
FIG. 4 is a view showing an example of an initial screen.

The controller 29 allows the display device 22 to display, for example, an initial screen G1 shown in FIG. 4. The contents displayed on the initial screen G1 include a plurality of function keys 31A, 31B, 31C, 31H, and so on associated with different functions. When the user touches the function key 31H representing a sheet feed setting mode, the controller 29 accepts through the touch panel 24 an instruction to start the sheet feed setting mode associated with the function key 31H and allows the display device 22 to display a sheet feed selection screen G2 shown in FIG. 5 (step S101).

The contents displayed on the sheet feed selection screen G2 include, for each of the first sheet feed cassette 71, the second sheet feed cassette 72, the third sheet feed cassette 73, the fourth sheet feed cassette 74, the fifth sheet feed cassette 75, and the manual feed tray 9, a button B1 through which an instruction to designate the sheet feed cassette or the manual feed tray as a sheet feed device for adjustment processing is accepted, a button B2 through which an instruction to designate the sheet feed cassette or the manual feed tray as a sheet feed device for print job is accepted, and a button B3 through which an instruction to designate the sheet feed cassette or the manual feed tray as an alternative sheet feed device is accepted.

For example, when the controller 29 detects through the touch panel 24 that the user has operated any one of the buttons B1 on the sheet feed selection screen G2 (step S102 "ADJUSTMENT"), the controller 29 accepts an instruction to select the sheet feed cassette or the manual feed tray associated with the operated button B1 as a sheet feed cassette for adjustment processing (step S103). Here, assume that, as an example, the controller 29 has accepted an instruction to select the third sheet feed cassette 73 as a sheet feed device for adjustment processing. The controller 29 allows the display device 22 to display a feeding sheet setting window W1 for adjustment processing as shown in FIG. 6 (step S104).

The contents displayed on the feeding sheet setting window W1 include: a size select button T11 through which an instruction to set the standard size of recording paper sheets P to be accommodated in the sheet feed cassette for adjustment processing is accepted; a type select button T12 through which an instruction to set the type of recording paper sheets P to be accommodated in the sheet feed cassette for adjustment processing is accepted; and an OK key K11.

When the user touches the size select button T11, the controller 29 accepts through the touch panel 24 an instruction to display pull-down options and allows the display device 22 to display respective pull-down buttons representing different standard sizes as options. The user touches, among the displayed pull-down buttons representing different standard sizes, a button representing a standard size of recording paper sheets P to be accommodated in the third sheet feed cassette 73 (the sheet feed device selected as the sheet feed device for adjustment processing), for example, a button representing "A4". The controller 29 accepts the standard size displayed on the touched button as a standard size of recording paper sheets P to be accommodated in the sheet feed cassette (step S105).

When the user touches the type select button T12, the controller 29 accepts through the touch panel 24 an instruction to display pull-down options and allows the display device 22 to display respective pull-down buttons representing predetermined different types of recording paper sheet P as options. The user touches, among the displayed buttons representing the different types, a button representing a type of recording paper sheets P to be accommodated in the third sheet feed cassette 73 (the sheet feed device selected as the sheet feed device for adjustment processing), for example, a button representing "plain paper". The controller 29 accepts the type displayed on the touched button as a type of recording paper sheets P to be accommodated in the sheet feed cassette (step S106).

The controller 29 associates "A4" as the standard size of recording paper sheets P accepted in step S106 and "plain paper" as the type of recording paper sheets P accepted in step S107 with the third sheet feed cassette 73 accepted as the sheet feed device for adjustment processing in step S103, and allows a data table DT as shown in FIG. 8 to store the associated standard size and type of recording paper sheets P as a set of attribute information about the associated sheet feed device for adjustment processing (step S109).

Furthermore, when the controller 29 detects through the touch panel 24 that the user has operated any one of the buttons B3 on the sheet feed selection screen G2 (step S102 "ALTERNATIVE"), the controller 29 accepts an instruction to select the sheet feed cassette associated with the operated button B3 as an alternative sheet feed cassette (step S110). Here, assume that, as an example, the controller 29 has accepted an instruction to select the fifth sheet feed cassette 75 as an alternative sheet feed device. The controller 29 allows the display device 22 to display a feeding sheet setting window W2 for an alternative sheet feed device as shown in FIG. 7 (step S111).

The contents displayed on the feeding sheet setting window W2 include: a size select button T21 through which an instruction to set the standard size of recording paper sheets P to be accommodated in the alternative sheet feed cassette is accepted; a type select button T22 through which an instruction to set the type of recording paper sheets P to be accommodated in the alternative sheet feed cassette is accepted; and an OK key K23.

When the user touches the size select button T21, the controller 29 accepts through the touch panel 24 an instruction to display pull-down options and allows the display device 22 to display respective pull-down buttons representing different standard sizes as options. The user touches, among the displayed pull-down buttons representing different standard sizes, a button representing a standard size of recording paper sheets P to be accommodated in the fifth sheet feed cassette 75 (the sheet feed device selected as the alternative sheet feed device), for example, a button representing "A3". The controller 29 accepts the standard size displayed on the touched button as a standard size of recording paper sheets P to be accommodated in the sheet feed cassette (step S112).

When the user touches the type select button T22, the controller 29 accepts through the touch panel 24 an instruction to display pull-down options and allows the display device 22 to display respective pull-down buttons representing predetermined different types of recording paper sheet P as options. The user touches, among the displayed buttons representing the different types, a button representing a type of recording paper sheets P to be accommodated in the fifth sheet feed cassette 75 (the sheet feed device selected as the alternative sheet feed device), for example, a button representing "recycled paper". The controller 29 accepts the type displayed on the touched button as a type of recording paper sheets P to be accommodated in the sheet feed cassette (step S113).

The controller 29 associates "A3" as the standard size of recording paper sheets P accepted in step S112 and "recycled paper" as the type of recording paper sheets P accepted in step S113 with the fifth sheet feed cassette 75 accepted as the alternative sheet feed device in step S110, and allows the data table DT to store the associated standard size and type of recording paper sheets P as a set of attribute information about the associated alternative sheet feed device (step S115).

When the controller 29 detects through the touch panel 24 that the user has operated any one of the buttons B2 on the sheet feed selection screen G2 (step S102 "PRINT"), the controller 29 accepts an instruction to select the sheet feed cassette associated with the operated button B2 as a sheet feed cassette for print job. In this case, the controller 29 executes settings and storage of a set of attribute information about the sheet feed device for print job in the same manner as in the case where the alternative sheet feed device is accepted.

The data table DT shown in FIG. 8 stores, about the first sheet feed cassette 71, print job, standard size "A4" of recording paper sheets P, and "plain paper" as the type of recording paper sheets P. The data table DT stores, about the second sheet feed cassette 72, print job, standard size "A3" of recording paper sheets P, and "plain paper" as the type of recording paper sheets P. The data table DT stores, about the third sheet feed cassette 73, adjustment processing, standard size "A4" of recording paper sheets P, and "plain paper" as the type of recording paper sheets P. The data table DT stores, about the fourth sheet feed cassette 74, adjustment processing, standard size "A3" of recording paper sheets P, and "plain paper" as the type of recording paper sheets P. The data table DT stores, about the fifth sheet feed cassette 75, alternative, standard size "A3" of recording paper sheets P, and "recycled paper" as the type of recording paper sheets P. The data table DT stores, about the manual feed tray 9, print job, standard size "A4" of recording paper sheets P, and "plain paper" as the type of recording paper sheets P.

Print job, adjustment processing, alternative, a standard size of recording paper sheets P, and a type of recording paper sheets P are constituents of the attribute information defined in CLAIMS.

Figure 3:
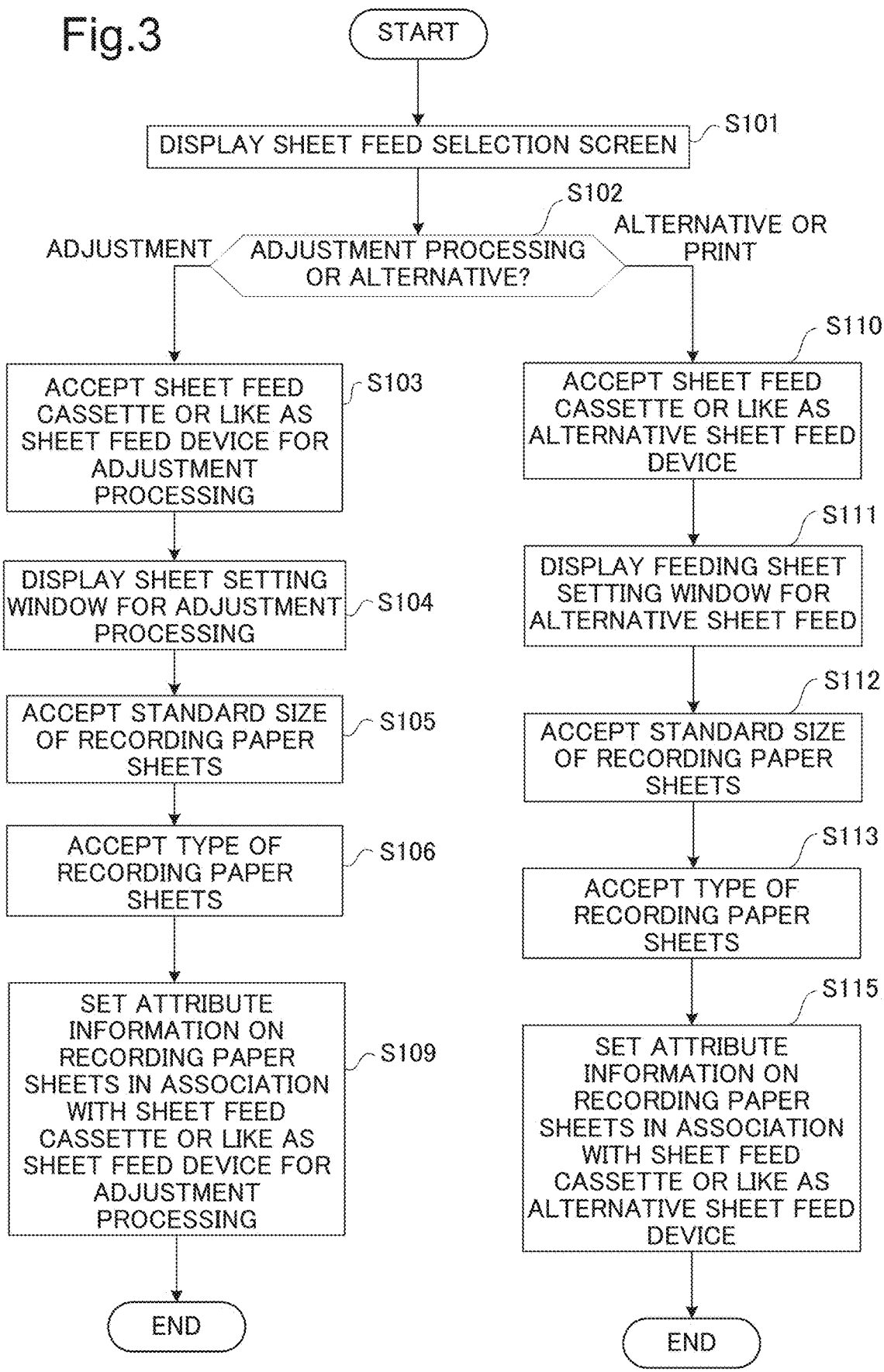
FIG. 3 is a flowchart showing sheet feed device setting processing.

When the respective sets of attribute information about the sheet feed cassettes 71 to 75 and the manual feed tray 9 are written into the data table DT in the above manner, the processing of the flowchart shown in FIG. 3 ends.

In this example, the standard size of recording paper sheets P accommodated in each of the sheet feed cassettes 71 to 75 is input on the feeding sheet setting window W1 or W2. However, it is possible that known recording paper sheet size detection sensors are provided to detect the respective standard sizes of recording paper sheets P accommodated in the sheet feed cassettes 71 to 75 and the controller 29 accepts the respective standard sizes of recording paper sheets P detected by these sensors as the respective sizes of recording paper sheets accommodated in the sheet feed cassettes.

Next, a description will be given of processing during execution of the adjustment processing. FIG. 9 is a flowchart showing a processing flow during execution of the adjustment processing.

The controller 29 counts the number of recording paper sheets P on which an image has been formed by the image forming device 12 based on a print job. When the number of recording paper sheets P counted reaches a predetermined threshold value (YES in step S201), the controller 29 allows the display device 22 to display, for example, an adjustment processing execution screen G11 shown in FIG. 10 (step S202). The contents displayed on the adjustment processing execution screen G11 include a function key 310 representing execution of adjustment processing ("EXECUTE ADJUSTMENT PROCESSING").

When the user touches the function key 310, the controller 29 accepts through the touch panel 24 an instruction to execute adjustment processing (YES in step S203). When the controller 29 has not accepted an instruction to execute adjustment processing within a certain period of time (for example, one minute) after the display of the adjustment processing execution screen G11 (NO in step S203), the controller 29 goes back to the processing in step S201 without executing the adjustment processing. When the number of recording paper sheets counted has not reached a predetermined threshold value (NO in step S201), the controller 29 repeats the processing in step S201.

When accepting an instruction to execute adjustment processing, the controller 29 detects, at this point in time, a sheet feed device for adjustment processing about which a set of attribute information containing setting values meeting the contents of adjustment processing to be executed is set (step S205). For example, in the case where the above-described Type II is intended to be executed as adjustment processing, the controller 29 detects, with reference to the data table DT, a sheet feed device for adjustment processing about which a set of attribute information containing setting values meeting the size, type, and so on of recording paper sheets P specified for Type II is set.

The controller 29 detects, for example, the fourth sheet feed cassette 74 associated with adjustment processing Type II. Which of adjustment processing Type I and Type II should be executed is previously set based on how the image forming apparatus 10 is actually used (such as the frequency of use of each standard size on the image forming apparatus 10). Furthermore, when a plurality of sheet feed devices for adjustment processing are selected, different sets of attribute information are set for the plurality of sheet feed devices for adjustment processing.

The controller 29 determines whether or not the sheet feed device for adjustment processing detected in step S205 is becoming unable to feed a recording paper sheet P, i.e., whether or not an error has occurred in the sheet feed device for adjustment processing (step S208). Examples of errors in the sheet feed device for adjustment processing include a state where no recording paper sheet P is accommodated in the sheet feed device for adjustment processing, and a state where the sheet feed device for adjustment processing does not work due to failure.

For example, when a recording paper sheet P is not conveyed from the sheet feed device for adjustment processing even though the controller 29 performs control for operating the sheet feed device for adjustment processing or when a recording paper sheet P pulled out of the sheet feed device for adjustment processing is not detected by a known sheet detection sensor placed downstream of the sheet feed device for adjustment processing in the direction of conveyance of the recording paper sheet, the controller 29 determines that an error has occurred in the sheet feed device for adjustment processing.

When the controller 29 determines that no error has occurred ("No" in step S208), the controller 29 allows the fourth sheet feed cassette 74 (the sheet feed device for adjustment processing) to feed a recording paper sheet P of standard size "A3", reads from the storage device 26 respective patterns in four colors adapted to the standard size "A3" for adjustment processing Type II, and allows the image forming device 12 to form the patterns in four colors on the recording paper sheet P of standard size "A3" (step S209). After the processing in step S209, the controller 29 goes back to step S201.

The recording paper sheet P of standard size "A3" on which the patterns in four colors have been formed is used for the purpose of adjusting the densities of the four color components of an image to be formed on a recording paper sheet P by the image forming device 12.

When the controller 29 determines that an error has occurred in the fourth sheet feed cassette 74 (the sheet feed device for adjustment processing) detected in step S205 ("Yes" in step S208), the controller 29 selects, with reference to the data table DT, a sheet feed cassette or the like set as the alternative sheet feed device (step S210). Here, assume that the fifth sheet feed cassette 75 has been selected as a sheet feed cassette or the like set to the alternative sheet feed device.

The controller 29 determines, at this point in time, whether or not the set of attribute information set about the fifth sheet feed cassette 75 (the alternative sheet feed device) contains setting values meeting the contents of adjustment processing to be executed (step S211). Specifically, when the size (or type) of recording paper sheet necessary for execution of adjustment processing coincides with the standard size (or the type) of recording paper sheets P set for the fifth sheet feed cassette 75 (the alternative sheet feed device), the controller 29 determines that the recording paper sheets P in the fifth sheet feed cassette 75 are applicable. Otherwise, the controller 29 determines that the recording paper sheets P in the fifth sheet feed cassette 75 are not applicable.

In this example, since the standard size "A3" which is the size of recording paper sheet necessary for execution of adjustment processing coincides with the standard size "A3" of recording paper sheets P indicated by the set of attribute information set about the fifth sheet feed cassette 75 (the alternative sheet feed device), the controller 29 determines that the recording paper sheets P in the fifth sheet feed cassette 75 are applicable ("Yes" in step S211), allows the fifth sheet feed cassette 75 to feed a recording paper sheet P of standard size "A3", reads from the storage device 26 respective patterns in four colors adapted to the standard size "A3" for adjustment processing Type II, and allows the image forming device 12 to form the patterns in four colors on the recording paper sheet P of standard size "A3" (step S209). After the processing in step S209, the controller 29 restarts the print job and goes back to step S201.

Unlike the above, assume that recording paper sheets P of standard size "A4" are accommodated in the fifth sheet feed cassette 75 as the alternative sheet feed device and standard size "A4" is stored in the data table DT in association with the fifth sheet feed cassette 75. In this case, since the standard size "A4" of recording paper sheets P in the fifth sheet feed cassette 75 does not coincide with the standard size "A3" which is the size of recording paper sheet necessary for execution of adjustment processing, the controller 29 determines that the recording paper sheets P in the fifth sheet feed cassette 75 are not applicable ("No" in step S211).

At this time, the controller 29 allows the display device 22 to display an error display screen G30 indicating that an error has occurred in the alternative sheet feed device as shown in FIG. 11 (step S212). The contents displayed on the error display screen G30 include a message E1 indicating that an error has occurred in a sheet feed cassette or the like and the sheet feed cassette or the like will be changed.

In this case, the controller 29 detects, with reference to the data table DT, another sheet feed cassette or the like accommodating a recording paper sheet P of standard size "A3" which is the size of recording paper sheet necessary for execution of adjustment processing, i.e., a sheet feed cassette or the like which is set as a sheet feed device for print job and about which a set of attribute information containing setting values meeting the contents of adjustment processing is set (step S213).

When there is a sheet feed device for print job about which a set of attribute information containing setting values meeting the contents of adjustment processing is set ("Yes" in step S213), the controller 29 selects this sheet feed device for print job (for example, the second sheet feed cassette 72) as a sheet feed cassette or the like that feeds a recording paper sheet P for use in image formation during adjustment processing (step S214).

The controller 29 allows the selected sheet feed cassette or the like, i.e., the second sheet feed cassette 72 in this example, to feed a recording paper sheet P of standard size "A3", reads from the storage device 26 respective patterns in four colors adapted to the standard size "A3" for adjustment processing Type II, and allows the image forming device 12 to form the patterns in four colors on the recording paper sheet P of standard size "A3" (step S209). After the processing in step S209, the controller 29 goes back to step S201.

Figure 12:
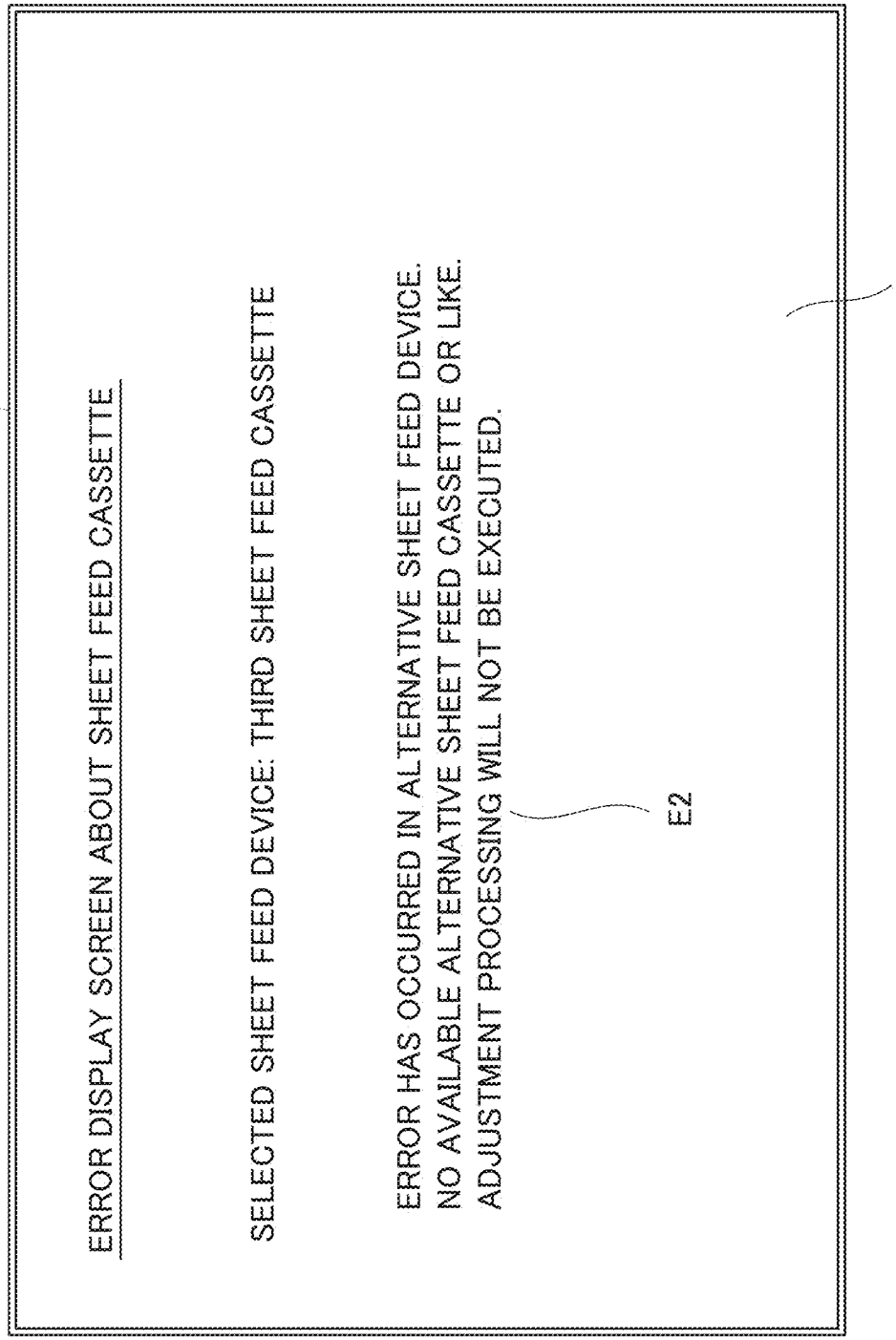
FIG. 12 is a view showing another example of an error display screen.

On the other hand, when there is no sheet feed device for print job about which a set of attribute information containing setting values meeting the contents of adjustment processing is set ("No" in step S213), the controller 29 allows the display device 22 to display an error display screen G31 about sheet feed cassettes as shown in FIG. 12 (step S215). The contents displayed on the error display screen G31 include a message E2 indicating that adjustment processing will not be executed due to an error about sheet feed cassettes. Then, the processing ends.

Generally, in executing adjustment processing, from among a plurality of sheet feed devices (such as sheet feed cassettes), a sheet feed device accommodating recording paper sheets of a type or size adapted to the adjustment processing is selected and a recording paper sheet is fed from the selected sheet feed device. The general recording apparatus described previously determines a recording medium on which a check pattern is to be recorded in order of priority of the size of recording medium and in order of priority of the type of recording medium, selects, from among the plurality of sheet feed cassettes, a cassette in which the determined type of recording medium is accommodated, and feeds a recording medium from the selected cassette. However, in the event of an error in the sheet feed device, the general recording apparatus cannot address the error and, thus, stops the adjustment processing.

Unlike the above, in the image forming apparatus 10, in executing adjustment processing, a sheet feed device for adjustment processing is selected based on the data table DT, a recording paper sheet P is fed from the selected sheet feed device for adjustment processing, and the image forming device 12 performs, on the fed recording paper sheet P, image formation during adjustment processing. In the event of an error in the selected sheet feed device for adjustment processing, a recording paper sheet P is fed, based on the data table DT, from an alternative sheet feed device or a sheet feed device for print job about which a set of attribute information containing setting values meeting the contents of the adjustment processing is set, and the image forming device 12 performs, on the fed recording paper sheet P, image formation during adjustment processing.

As seen from the above, even if there occurs an event that a sheet feed device intended to feed a recording paper sheet P for the adjustment processing is unable to feed a recording paper sheet P for image formation, the image forming apparatus 10 according to the first embodiment enables a recording paper sheet P to be fed and can prevent stopping of the adjustment processing.

Furthermore, the image forming apparatus 10 according to the first embodiment can use, according to the user's operation, the sheet feed cassettes 71 to 75 and the manual feed tray 9 separately for the purpose of feeding a recording paper sheet P intended for a print job, for the purpose of feeding a recording paper sheet P intended for adjustment processing, or for the purpose of feeding an alternative recording paper sheet P.

Second Embodiment

Figure 13:
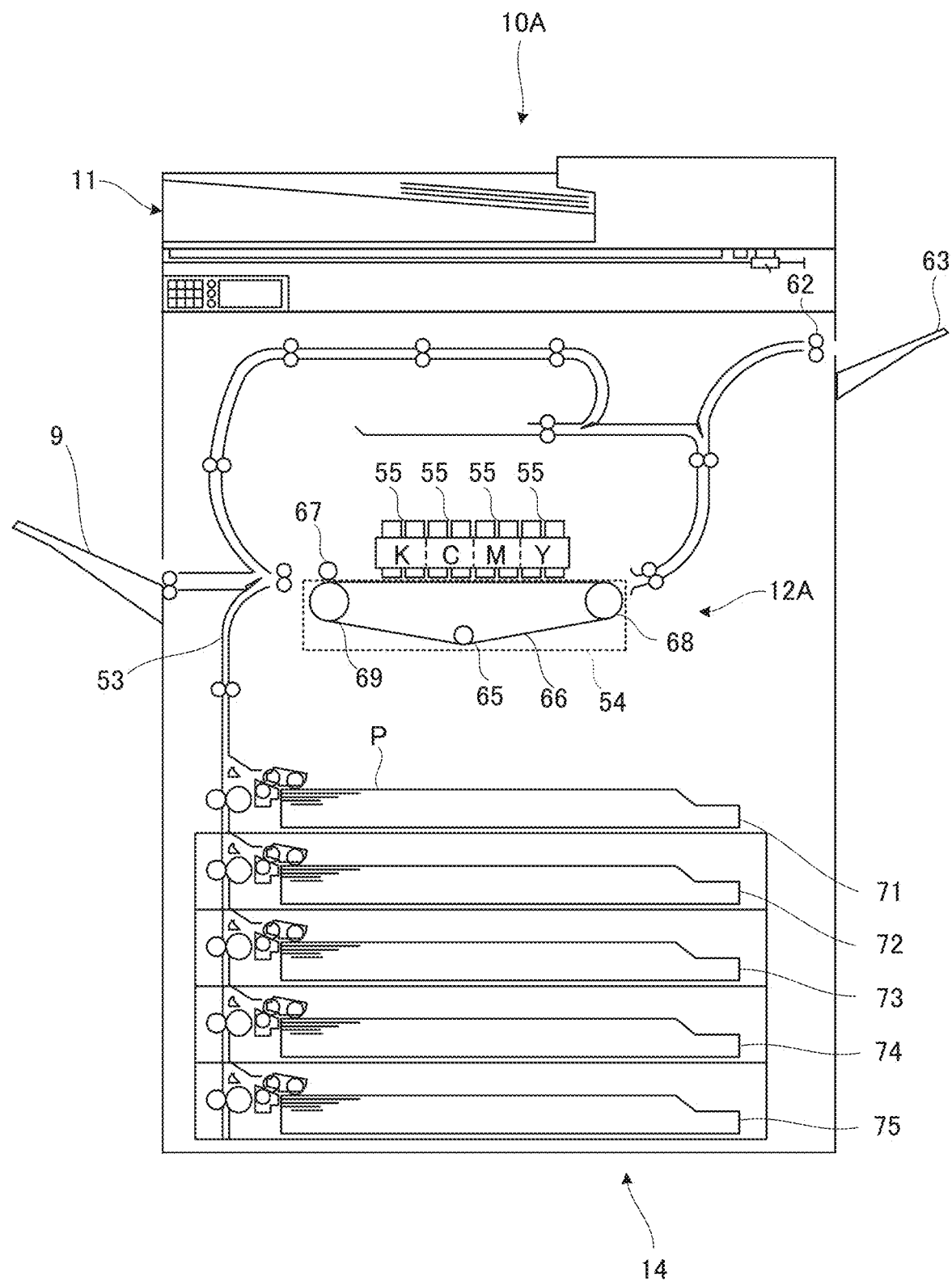
FIG. 13 is a cross-sectional view showing an image forming apparatus according to a second embodiment of the present disclosure.

FIG. 13 is a cross-sectional view showing an image forming apparatus according to a second embodiment of the present disclosure. In FIG. 13, components having the same functions as those in FIG. 1 are designated by the same reference characters and further explanation thereof will be omitted.

An image forming apparatus 10A according to the second embodiment includes an image reading device 11 and an image forming device 12A. The image reading device 11 includes an image pickup device that optically reads an image of an original document, and generates image data representing the image of the original document from an analog output of the image pickup device.

The image forming device 12A forms, on a recording paper sheet, an image represented by the image data in an ink-jet system. The image forming device 12A includes line heads 55 (examples of the ink heads) that eject ink droplets of four individual colors (black, cyan, magenta, and yellow). Each line head 55 ejects ink droplets of the individual color onto a recording paper sheet P being conveyed from the sheet feeder 14 through a conveyance path 53 to a conveyance unit 54 to form a multicolor image on the recording paper sheet P.

The conveyance unit 54 includes a drive roller 68, a driven roller 69, a tension roller 65, and a conveying belt 66. The conveying belt 66 is an endless belt and is mounted around the drive roller 68, the driven roller 69, and the tension roller 65. The drive roller 68 is a roller that is driven into clockwise rotation by a motor. When the drive roller 68 is driven into rotation, the conveying belt 66 is traveled in a clockwise loop and, thus, the driven roller 69 and the tension roller 65 are driven into clockwise rotation.

The tension roller 65 is a roller that appropriately holds the tension of the conveying belt 66. An adsorption roller 67 is in contact with the conveying belt 66. The adsorption roller 67 electrically charges the conveying belt 66 to electrostatically adsorb on the conveying belt 66 a recording paper sheet P being fed from the sheet feeder 14.

The recording paper sheet P with an image of an original document formed thereon by the image forming device 12A is conveyed along an intermediate conveyance path and then ejected through a driven roller 62 to a sheet output tray 63.

The sheet feeder 14 includes a first sheet feed cassette 71, a second sheet feed cassette 72, a third sheet feed cassette 73, a fourth sheet feed cassette 74, and a fifth sheet feed cassette 75. A recording paper sheet P is fed and conveyed from one of the sheet feed cassettes 71 to 75 to the conveyance path 53.

Next, a description will be given of a structure relating to the control of the image forming apparatus 10A according to the second embodiment. The structure relating to the control of the image forming apparatus 10A is approximately the same as that of the image forming apparatus 10 according to the first embodiment. The image forming apparatus 10A according to the second embodiment is different from the first embodiment in that it adopts, instead of the image forming device 12 based on an electrophotographic system, the image forming device 12A based on an ink-jet system.

A controller 29 of the image forming apparatus 10A according to the second embodiment controls the image forming device 12A based on an ink-jet system to execute a print job by allowing the image forming device 12A to form an image of an original document on a recording paper sheet in the above manner.

Furthermore, the controller 29 counts the number of recording paper sheets P on which an image has been formed by the image forming device 12A. When the number of recording paper sheets P counted reaches a predetermined threshold value, the controller 29 performs adjustment processing by allowing the line heads 55 of the image forming device 12A to purge ink onto a recording paper sheet P. This ink purging is performed for the purpose of preventing clogging of nozzles of the line heads 55.

Although the image forming apparatus 10A according to the second embodiment is different from the image forming apparatus 10 according to the first embodiment in that the image forming device 12A based on an ink-jet system is used instead of the image forming device 12 based on an electrophotographic system, the processing shown in FIGS. 3 and 9 is executed in the same manner as in the image forming apparatus 10 and a recording paper sheet P intended for use in adjustment processing can be fed from any one of the sheet feed cassettes 71 to 75 and the manual feed tray 9.

The present disclosure is not limited to the structures and configurations of the above embodiments and can be modified in various ways. The structures and configurations of the above embodiments described with reference to FIGS. 1 to 13 are merely illustrative of the present disclosure and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a plurality of sheet feed devices that feed a recording paper sheet;
an image forming device that performs, on the recording paper sheet fed from one of the sheet feed devices, image formation based on a print job or adjustment processing that is image formation for a predetermined adjustment; and
a control device that includes a processor and functions, through the processor executing a control program, as a controller that, in executing the adjustment processing, selects, from among the plurality of sheet feed devices, the sheet feed device for adjustment processing about which attribute information meeting a necessary condition for executing the adjustment processing is previously set, allows the selected sheet feed device for adjustment processing to feed the recording paper sheet, and allows the image forming device to perform the adjustment processing,
wherein when, in executing the adjustment processing, the sheet feed device for adjustment processing is unable to feed the recording paper sheet, the controller allows a sheet feed device predetermined as an alternative sheet feed device for adjustment processing to feed the recording paper sheet.

2. The image forming apparatus according to claim 1, further comprising an operation device to which a user's instruction is input,
wherein the controller previously sets the alternative sheet feed device according to the instruction input to the operation device.

3. The image forming apparatus according to claim 1, wherein
for each of the sheet feed devices, size information indicating a size of the recording paper sheet to be fed by the sheet feed device is previously set, and
when, in executing the adjustment processing, the sheet feed device for adjustment processing is unable to feed the recording paper sheet, the controller selects as the alternative sheet feed device, from among the plurality of sheet feed devices, the sheet feed device about which the size information identical with the attribute information set about the sheet feed device for adjustment processing is set.

4. The image forming apparatus according to claim 1, further comprising a display device,
wherein when an error that makes the alternative sheet feed device unable to feed the recording paper sheet occurs, the controller allows the display device to display an error screen indicating an occurrence of the error.

5. The image forming apparatus according to claim 1, further comprising an operation device to which a user's instruction is input,
wherein the controller previously sets the sheet feed device for adjustment processing according to the instruction input to the operation device.

6. The image forming apparatus according to claim 1, wherein
the image forming device forms an image on the recording paper sheet in an electrophotographic system, and
the controller executes, as the adjustment processing, processing of allowing the image forming device to form a predetermined pattern on the recording paper sheet.

7. The image forming apparatus according to claim 1, wherein
the image forming device forms an image on the recording paper sheet in an ink-jet system, and
the controller executes, as the adjustment processing, processing of allowing the image forming device to purge ink onto the recording paper sheet.

8. The image forming apparatus according to claim 1, wherein
for each of the sheet feed devices, type information indicating a type of the recording paper sheet to be fed by the sheet feed devices is previously set, and
when, in executing the adjustment processing, the sheet feed device for adjustment processing is unable to feed the recording paper sheet, the controller selects as the alternative sheet feed device, from among the plurality of sheet feed devices, the sheet feed device about which the type information identical with the attribute information set about the sheet feed device for adjustment processing is set.

* * * * *